US009171425B2

(12) United States Patent
Lauzon et al.

(10) Patent No.: US 9,171,425 B2
(45) Date of Patent: Oct. 27, 2015

(54) GAMING DEVICE WITH INTERACTIVE SPIN ACTION VISUAL EFFECTS

(75) Inventors: Vincent Lauzon, Laval (CA); Rony Karam, Montreal (CA)

(73) Assignee: INGENIO, FILIALE DE LOTO-QUÉBEC INC., Montreal, QC (CA)

( * ) Notice: Subject to any disclaimer, the term of this patent is extended or adjusted under 35 U.S.C. 154(b) by 230 days.

(21) Appl. No.: 12/668,960

(22) PCT Filed: Jul. 14, 2008

(86) PCT No.: PCT/CA2008/001286

§ 371 (c)(1), (2), (4) Date: Jan. 13, 2010

(87) PCT Pub. No.: WO2009/009880

PCT Pub. Date: Jan. 22, 2009

(65) Prior Publication Data

US 2010/0190545 A1 Jul. 29, 2010

Related U.S. Application Data

(60) Provisional application No. 60/929,846, filed on Jul. 13, 2007.

(51) Int. Cl.

*G06F 17/00* (2006.01)
*G06F 19/00* (2011.01)
*G07F 17/34* (2006.01)
*G07F 17/32* (2006.01)

(52) U.S. Cl.

CPC ............ *G07F 17/34* (2013.01); *G07F 17/3211* (2013.01); *G07F 17/3213* (2013.01); *G07F 17/3269* (2013.01)

(58) Field of Classification Search

CPC .................................................... G07F 17/3209
See application file for complete search history.

(56) References Cited

U.S. PATENT DOCUMENTS

| | | | | | |
|---|---|---|---|---|---|
| 3,684,290 | A * | 8/1972 | Wayne | ...................... | 273/143 C |
| 4,373,727 | A * | 2/1983 | Hooker et al. | ............ | 273/143 R |
| 4,433,844 | A * | 2/1984 | Hooker et al. | ............ | 273/143 R |
| RE34,244 | E * | 5/1993 | Hagiwara | ....................... | 463/20 |

(Continued)

FOREIGN PATENT DOCUMENTS

| | | | |
|---|---|---|---|
| CN | 1959736 | A | 5/2007 |
| JP | 2000-167241 | A | 6/2000 |

OTHER PUBLICATIONS

International Search Report.

(Continued)

*Primary Examiner* — Steven J Hylinski
(74) *Attorney, Agent, or Firm* — Anglehart et al.

(57) ABSTRACT

The present invention relates to a reel-type slot machine having interactive spin action visual effects. The reel-type slot machine includes at least M reels, each reel having symbols associated with it; a video display for displaying a video image of a M N matrix of squares, each square associated with a symbol of a corresponding reel; and a spin actuator for initiating play and interactively producing spin action visual effects associated with the M×N matrix of squares by inputting a direction vector and speed, wherein the direction vector and speed respectively determine the direction and speed of the spin action visual effects. Preferably, the spin actuator is a trackball.

25 Claims, 6 Drawing Sheets

(56) References Cited

U.S. PATENT DOCUMENTS

| | | | | |
|---|---|---|---|---|
| 5,584,764 | A * | 12/1996 | Inoue | 463/20 |
| 5,725,428 | A * | 3/1998 | Achmuller | 463/20 |
| 6,375,570 | B1 * | 4/2002 | Poole | 463/31 |
| 6,846,238 | B2 * | 1/2005 | Wells | 463/39 |
| 6,942,571 | B1 * | 9/2005 | McAllister et al. | 463/20 |
| 7,674,176 | B2 * | 3/2010 | Berman et al. | 463/20 |
| 7,699,703 | B2 * | 4/2010 | Muir et al. | 463/29 |
| 8,047,910 | B2 * | 11/2011 | Isaac et al. | 463/20 |
| 2001/0005425 | A1 | 6/2001 | Watanabe et al. | |
| 2003/0073480 | A1 * | 4/2003 | Thomas et al. | 463/18 |
| 2004/0229674 | A1 * | 11/2004 | Thomas | 463/16 |
| 2005/0032568 | A1 | 2/2005 | Griswold et al. | |
| 2006/0189382 | A1 * | 8/2006 | Muir et al. | 463/29 |
| 2007/0060323 | A1 * | 3/2007 | Isaac et al. | 463/29 |
| 2007/0173307 | A1 | 7/2007 | Aida | |
| 2008/0009336 | A1 * | 1/2008 | Walker et al. | 463/16 |
| 2008/0090636 | A1 * | 4/2008 | Lathrop | 463/20 |
| 2009/0131150 | A1 * | 5/2009 | Iverson et al. | 463/20 |
| 2009/0312095 | A1 * | 12/2009 | Durham et al. | 463/30 |
| 2010/0222128 | A1 * | 9/2010 | Berman et al. | 463/20 |
| 2011/0117987 | A1 * | 5/2011 | Aoki et al. | 463/20 |

OTHER PUBLICATIONS

Australian application 2008278226 examination report dated Mar. 23, 2012 with related claims.

Canadian application 2693747 examination report dated Feb. 14, 2013 with related claims.

* cited by examiner

GAMING DEVICE WITH INTERACTIVE SPIN ACTION VISUAL EFFECTS

FIELD OF THE INVENTION

The present invention relates generally to gaming devices and methods. More specifically, the invention relates to electronic reel-type slot machines having interactive spin action visual effects.

BACKGROUND OF THE INVENTION

Gaming devices engage players in a game of chance. A player places a bet, e.g. by inserting money or some equivalent of value, and then actuates the gaming device thereby initiating the game of chance. The object of the game is to win money from the gaming device. One such popular gaming device is the slot machine.

A conventional electromechanical reel-spinning slot machine generally includes a plurality of mechanical rotatable reels controlled by a processor. Video slot machines operate the same way as conventional reel-spinning machines, but they use a video display with virtual reels rather than actual rotating reels.

With a reel-spinning slot machine, a player places a bet by inserting money or some equivalent of value, such as a bar-coded paper ticket, into a designated slot in the machine. Play is then initiated—usually by pulling a handle, pushing a button or pressing a key on a touchscreen. The reels spin and come to a stop. The slot machine displays the results of the spin. For each reel, the stop position, and the resulting symbol, is decided randomly and independently of the other reels by the random number generator program of the processor. A payoff is made to a player when a winning combination of symbols is displayed on the payline of the machine.

Slot machines come with varying numbers of reels and many have multiple pay lines. Most machines with multiple pay lines allow players to choose the number of lines to play. By placing the minimum bet, usually only the single line running straight across the reels, i.e. the main pay line, counts. If the player wagers more, he or she can play the additional horizontal lines above and below the main pay line or the diagonal lines running across the reels.

In order to stimulate player interest in such machines, additional features and novelties can be added to the basic slot machine. For example, U.S. Pat. No. 5,449,173 describes a supplemental payoff sequence during which the reel on which the wildcard symbol appears is caused to shake or jitter while coins fall into the trough as if money were being shaken off a tree. In U.S. Pat. No. 6,056,642 reel symbols are coloured by backlighting the symbols with coloured light bulbs or similar means. U.S. Pat. No. 6,517,433 describes a spinning reel slot machine with a video image superimposed upon the mechanical reels of the machine. U.S. Pat. No. 6,942,571 describes a mechanical slot machine with a touch screen overlay detecting touch on each reel to control the spin start/stop of each reel. It would therefore be desirable to enhance entertainment by providing features and visual effects that are out of the ordinary and interesting to players.

SUMMARY OF THE INVENTION

It is an object of the present invention to provide a video slot machine presenting a display of a two-dimensional matrix wherein each cell of the matrix acts as an independent reel to which a sequence of symbols is associated.

It is another object of the present invention to provide an apparatus for initiating rotation of reels of a slot machine according to a sequence selected as a function of user input.

It is yet another object of the present invention to provide an apparatus for controlling a rotation of reels of a slot machine according to their position with respect to a user provided reference point.

In accordance with one aspect of the present invention, there is provided a video slot machine comprising: a display including a representation of a two-dimensional matrix of symbol display cells, each one of the cells containing a displayed symbol that is part of a predetermined sequence of symbols associated with one virtual reel; and a reel rotation controller for independently rotating the virtual reel for the cells, wherein the controller causes the display to present independent reel states in all of the cells with an animation of rotation, and to stop the rotation at a final outcome symbol for each of the cells, wherein the animation of rotation is controlled to follow a two dimensional spatial pattern of at least one of speed, start and stop with respect to the cells.

In accordance with another aspect of the present invention, the video slot machine further comprises a user spin actuator for receiving user input, wherein the controller is responsive to the user input for controlling the rotation.

In accordance with another aspect of the present invention, the animation of rotation is controlled to follow a two dimensional spatial pattern defining at least an order of reel rotation initiation.

In accordance with yet another aspect, the animation of rotation is controlled to follow a two dimensional spatial pattern defining at least an order of reel rotation stop.

In accordance with yet another aspect, the animation of rotation is controlled to follow a two dimensional spatial pattern defining at least an animation direction for each of the reels.

In accordance with yet another aspect, the animation of rotation is controlled to follow a two dimensional spatial pattern defining speed of rotation for each of the reels.

In accordance with yet another aspect, the video slot machine further comprises a pattern selector for selecting the spatial pattern from a plurality of spatial patterns according to the user input.

In accordance with yet another aspect, the user input comprises a vector, and the pattern selector selects the spatial pattern according to the vector.

In accordance with yet another aspect, the pattern selector selects the spatial pattern according to a direction of the vector.

In accordance with yet another aspect, the user input comprises a reference point, and the pattern selector selects the spatial pattern according to a position of each of the reels with respect to a position of the reference point.

In accordance with yet another aspect, the pattern selector selects the spatial pattern according to distances between the reference point and each of the reels.

In accordance with yet another aspect, the spatial pattern is a wave propagating across the matrix, and those of the cells defining a wave front present a same animation of rotation.

In accordance with yet another aspect, the animation comprises presenting the symbols as sliding in and out of the cells according to the sequence.

In accordance with yet another aspect, there is provided a reel type gaming device having interactive spin action visual effects, the reel-type gaming device including at least M reels, each reel having a number of symbols associated with it; a video display for displaying a video image of a M×N matrix of squares, each square associated with a symbol of a corresponding reel; and a spin actuator for interpreting user action to generate a variable direction vector as a function of the user action, the direction vector being fed to means to initiate a reel spin cycle and interactively produce different visual effects associated with the M×N matrix of squares as a function of the direction vector.

In accordance with yet another aspect, the gaming device includes M×N number of reels, and each of the squares exclusively presents the symbols of a corresponding one of the reels.

In accordance with yet another aspect, the matrix is larger than a three by three matrix.

In accordance with yet another aspect, the display presents horizontal and vertical paylines.

In accordance with yet another aspect, the visual effects comprise presenting the symbols as sliding in and out of the cells according to the sequence.

In accordance with yet another aspect, there is provided an apparatus for controlling rotation of reels of a mechanical slot machine having mechanical reels carrying symbols, the apparatus comprising: a user spin actuator for receiving user input; a feature manager for selecting rotation features for each of the reels according to the user input, the features defining at least one of a rotation start, stop and speed; and a reel rotation controller responsive to the features for controlling the rotation of reels, wherein the feature manager comprises at least one of: an order selector for selecting one of a plurality of reel rotation orders according to the user input; and a position analyzer for calculating a positional value for each of the reels as a function of a position of the reel with respect to a position of a reference point, and selecting rotation features according to the positional value, the user input comprising the reference point.

In accordance with yet another aspect, the user input comprises a vector, and the selector selects the order according to a direction of the vector.

In accordance with yet another aspect, the order selector selects one of a plurality of orders of reel rotation start according to the user input, and the controller starts the rotation according to the selected order of reel rotation start.

In accordance with yet another aspect, the position analyzer selects a speed for each of the reels as a function of the positional value, the positional value is a distance between the reference point and the reel, and the controller rotates the reels at the speed.

In accordance with yet another aspect, the spin actuator is a track ball.

The objects, advantages and other features of the present invention will become more apparent and be better understood upon reading of the following non-restrictive description of the preferred embodiments of the invention, given with reference to the accompanying drawings. The accompanying drawings are given purely for illustrative purposes and should not in any way be interpreted as limiting the scope of the invention.

BRIEF DESCRIPTION OF THE DRAWINGS

These and other features, aspects, and advantages of the present invention will become better understood with regard to the following description and accompanying drawings wherein.

DESCRIPTION OF PREFERRED EMBODIMENTS OF THE INVENTION

The present invention will be described more fully hereinafter with reference to the accompanying drawings, in which like numerals refer to like elements throughout.

Figure 1:
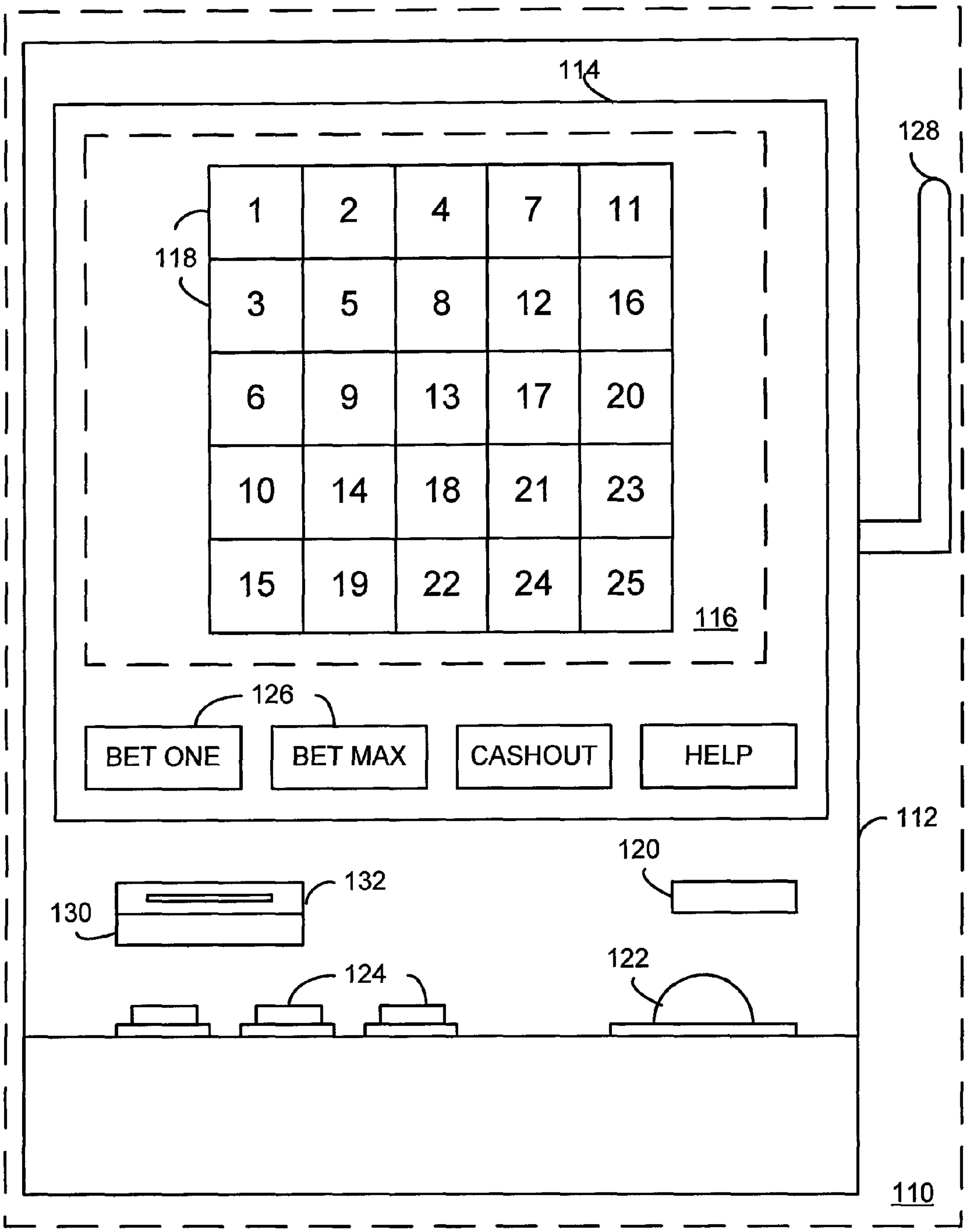
FIG. 1 illustrates a video slot machine displaying a matrix of symbol display cells presenting independent reel states.

Referring to FIG. 1, a video slot machine is illustrated. A slot machine (110) has a cabinet (112), which houses the electronic and computer circuitry and mechanical components used to operate the slot machine (110).

A microprocessor control system and a game-specific computer program is used to operate the slot machine. The computer program is based on a random number generator and uses at least M reels to generate results. The reels are preferably virtual reels as opposed to mechanical reels.

Figure 3A:
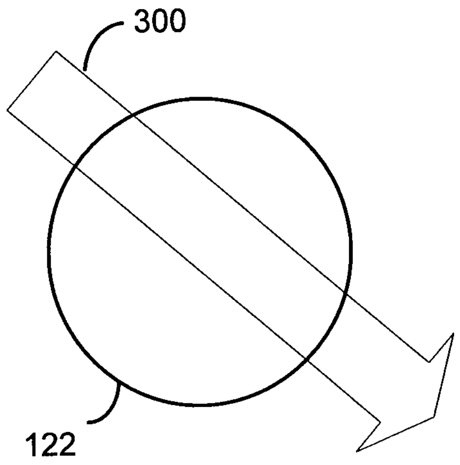
FIG. 3A illustrates a hand spinning a trackball to provide a vector.
Figure 3B:
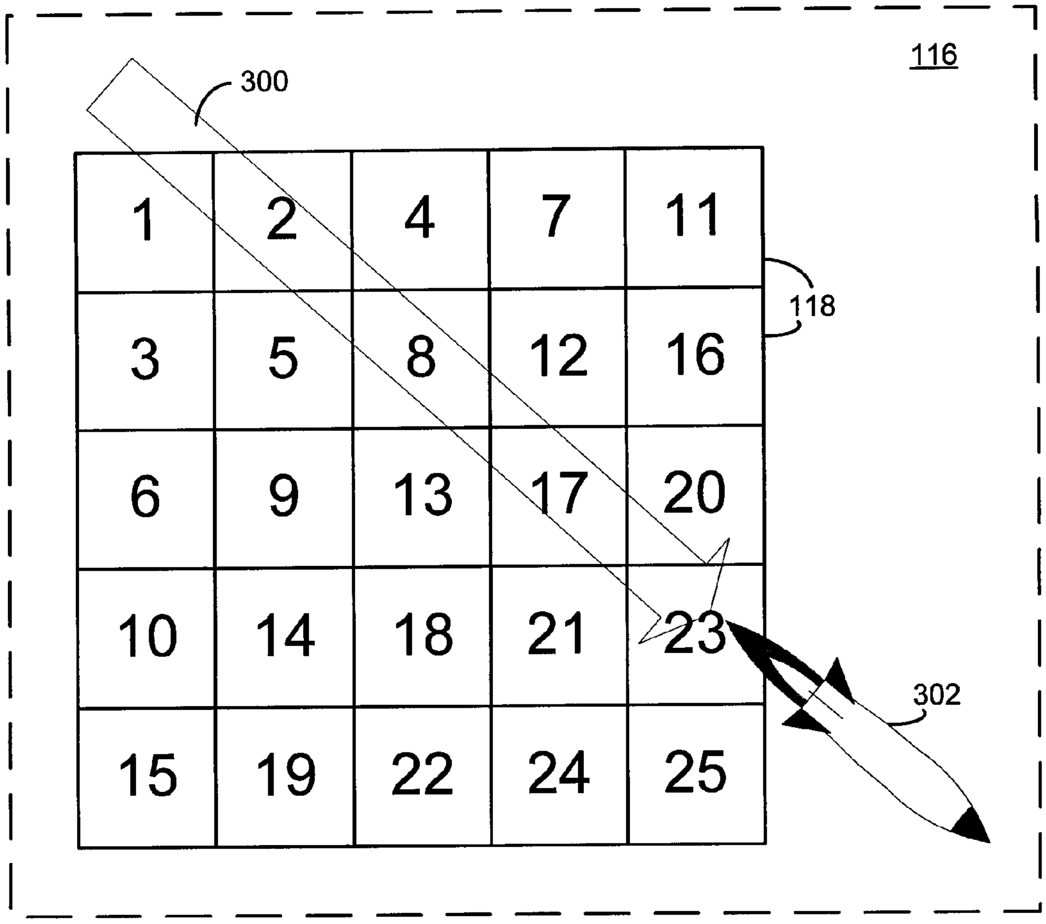
FIG. 3B illustrates the matrix over which is overlapped a visual indicator of the direction of the vector.

The upper section of the cabinet (112) includes a video display (114) (see also FIG. 3B). The video display may be a liquid crystal display (LCD), dot matrix display, light-emitting diode (LED) display, electro-luminescent display, or any other appropriate video display. It may incorporate a touch-screen feature for accommodating player input. The video display displays a video image (116) of a M×N matrix of squares (118). Each square (118) has associated to it a symbol, commonly referred to as a reel stop, on one of the at least M reels of the slot machine (110). The video display may further include such graphics as payout values, a pay table, paylines, bonus game features, and instruction information. It is important to note that M and N may each represent any designated number and as a result, each may represent a distinct number or both may represent a same number. Also, and for the purposes of the specification, a matrix square should be understood to designate a matrix cell as opposed to a specific shape or a cell of a specific shape. Consequently, matrix squares should not be limited to a same or a specific shape. Furthermore, a matrix is not limited to a rectangular matrix, but can be different arrangements, such as hexagonal or honeycomb, close packed, spiral, or radial.

To activate the slot machine, the player introduces money into the slot machine via a mechanical money entry slot (120) wherein a money comparator mechanism ascertains the legitimacy of the currency. Alternatively, the player may choose to use cashless means to activate the slot machine, for example by inputting coupons, credit cards, debit cards, bar-coded paper tickets, or other mechanical or electronic means known in the art.

When monetary credits have been successfully inputted, the spin actuator, herein also referred to as reels spin actuator or game start actuator, is enabled. The spin actuator preferably includes a trackball (122) built into the cabinet (112) of the slot machine (110). By spinning the trackball 22, the player inputs a direction vector (300) and a speed to initiate a reel spin cycle and interactively produce visual effects associated with the video image (116) of M×N matrix of squares (118). The player may forego the use of the trackball (122), and initiate play, i.e. a reel spin cycle, by redundant input means such as pressing a button (124) on the cabinet (112) of the slot machine (112) or a touchscreen key (126) on the video display (114), or by pulling a handle (128) on the side of the slot machine (110). In the latter case, the direction vector (300) and speed is either determined randomly or by the last direction vector and speed determined by the trackball during play.

By initiating a reel spin cycle, the microprocessor control system operating the slot machine (110) randomly selects the symbols to be displayed in the squares (118) of the M×N matrix of the video image (116), and hence the symbols to be displayed on the payline or paylines. The difference between a typical slot machine and the present slot machine stems primarily from the direction vector and speed input used to create a visually entertaining and interesting effect as the resulting symbols following a reel spin cycle are displayed. If the symbols displayed are a winning combination, the microprocessor signals a payoff to the player. The payoff may be in the form of money dispensed in a payout trough (130) or credits which may be redeemed at a later time by the player by selecting a cashout feature, for example by pressing a button on the cabinet (112) or a touchscreen key to receive from the payout slot (132) a credit receipt in the amount of the accrued winnings cashable at a designated cashier.

In a traditional mechanical slot machine and at any time during the course of a game, only a partial view of a spinning reel is presented to players through a displayed matrix. More specifically, a one-dimensional matrix display simultaneously presents a single symbol section of each reel, whereas a two dimensional matrix simultaneously presents two or more (often three or four) neighbouring symbols or substantially contiguous sections of each reel. For the purposes of the specification, a snapshot of one or more sections of a reel presented by a matrix is referred to as a reel state. In the case of a slot machine having horizontally spinning reels and displaying a two-dimensional matrix, horizontally contiguous cells are dependent on a same reel and as such, they are limited in the number of sequences that they may collectively present and the manner in which they may present them. The same limitations apply to vertically contiguous cells in the case of vertically spinning reels. While traditional video slot machines enable each of such contiguous cells to present symbols in a distinct manner, the remaining limitations subsist due to the aforementioned dependency on a same reel.

The present invention provides a video slot machine presenting a display of a two-dimensional matrix, each cell of which is completely independent from contiguous and incontiguous cells. This is achieved by assigning a distinct and virtual reel to each cell, wherein symbols of a reel are exclusively presented by a corresponding cell, and whereby limitations associated to a dependency of several contiguous cells on a same virtual reel are avoided. The resulting slot machine displays a greater variety of sequences, which constitutes an improvement over monotonous displays of traditional models.

Figure 2:
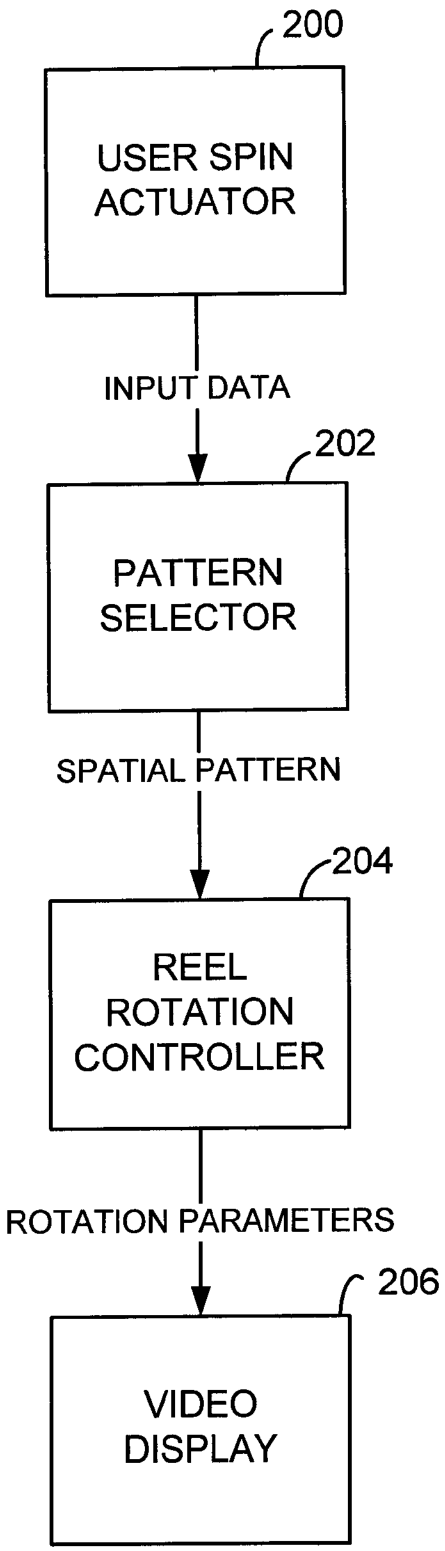
FIG. 2 is a block diagram of the video slot machine of the present invention.

Referring to FIG. 2, a block diagram of the video slot machine of the present invention is illustrated. The video slot machine comprises a display (206) including a representation of the matrix, each cell of which contains a symbol that is part of a sequence of symbols associated with a virtual reel. It also comprises a reel rotation controller (204) for independently rotating the virtual reel for the cells, wherein the controller (204) causes the display (206) to present independent reel states in all of the cells with an animation of rotation, and to stop the rotation at a final outcome symbol for each of the cells, wherein the animation of rotation is controlled to follow a two dimensional spatial pattern of at least one of speed, start and stop with respect to the cells.

For the purposes of the specification, a reel of a video slot machine is also referred to as a virtual reel. The sequence of symbols associated to a virtual reel may be randomly generated at the beginning of each game or as a reel is rotated, whereby a greater variety of sequences of symbols is presented by matrix cells, both individually and collectively, across a series of games. Alternatively, the aforementioned sequence may be predetermined, which provides players with a greater sense of continuity within a game, and from one game to the next. Moreover, all virtual reels can carry a same set of symbols, or each virtual reel or group thereof can carry a distinct set of symbols. Furthermore, and according to a preferred embodiment, all symbols of a sequence associated to a virtual reel are displayed several times over the course of a game. However, according to another embodiment only one symbol per virtual reel per game is presented, wherein the presented symbol corresponds to the final outcome symbol of a corresponding reel.

A rotation of a virtual reel should not be understood to necessarily involve a physical rotation of an object or a display thereof. A virtual reel is said to be rotated if a new symbol of a sequence associated thereto is presented by a cell through transitional animations. The aforementioned animations are applied to each matrix cell to indicate the presentation of a new symbol within a corresponding cell. They may, for instance, consist in having symbols sequentially slide in and out of cells, appear and disappear within cells, or ornate faces of a flipping card or coin. According to one embodiment of the present invention, a same transitional animation is applied to each matrix cell, wherein the animation indicates the presentation of a new symbol within a corresponding cell. According to another embodiment, a different transitional animation is assigned and applied to each matrix cell, whereby rotations of virtual reels are represented differently within a matrix cell or a group thereof.

Virtual reels may be rotated at a same and constant speed, at a same yet variable speed, at different yet constant speeds, or at different and variable speeds. Furthermore, they may be stopped simultaneously or in a sequential manner thereby imparting a greater sense of near win to players.

Traditional slot machines allow players to place wagers on one or more paylines, all of which belong to a same category. For instance, in the case of horizontally spinning reels, paylines are limited to vertically contiguous cells whereas in the case of vertically spinning reels, paylines are essentially limited to horizontally contiguous cells. However, according to a preferred embodiment of the present invention, and with reference to FIG. 1, the video slot machine provides players with the opportunity to place wagers on any of at least three types of paylines, a first of which consists in a series of horizontally contiguous cells, a second of which consists in a series of vertically contiguous cells, and a third of which consists in a cluster of cells. The greater variety of paylines improves the entertainment value of slot machines of the present invention with respect to traditional slot machines.

A spatial pattern may consist in any constant or varying surface within matrix that defines rotation parameters for reels associated to encompassed cells. For instance, such a pattern may define an order of reel rotation initiation, an order of reel rotation stop, an animation direction, or a rotation speed for each of the encompassed reels. An animation direction consists in a direction along which a transitional animation is applied. For instance, it would define the direction according to which symbols are to slide in and out of cells, or the direction according to which a symbol carrying coin is to rotate. According to the preferred embodiment of the invention, the pattern consists in a wave propagating across the matrix, and those of the cells defining a wave front present a same animation of rotation.

Referring back to FIG. 2, and according to a preferred embodiment of the invention, the video slot machine also comprises a spin actuator (200) for receiving user input, as well as a pattern selector (202) for selecting one of a plurality of spatial patterns according to the received user input. The spin actuator (200) may for instance be a track ball, a touchscreen, a standard slot machine button, or any combination thereof.

Figure 4:
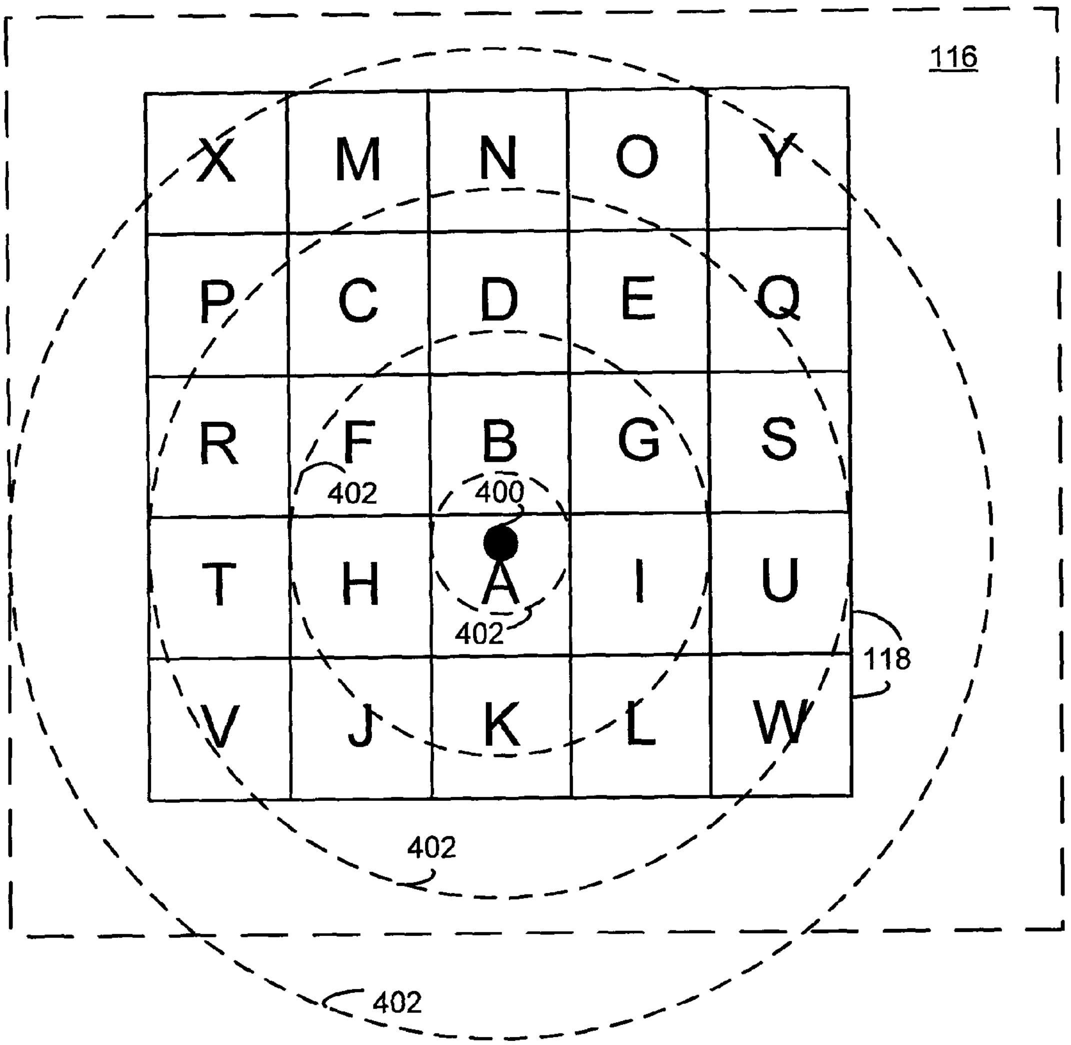
FIG. 4 illustrates a reference point provided by a player within the matrix and a spatial pattern selected according thereto.

According to one embodiment described in further detail herein below, the user input consists in a vector, and the pattern selector selects a spatial pattern according to the direction of the vector. However, according to another embodiment described in further detail herein below, the user input consists in a reference point, and the pattern selector selects a spatial pattern according to the position of each cell with respect to that of the reference point. Referring now to FIG. 4, there is illustrated a reference point provided by a player within the matrix and a spatial pattern selected according thereto.

The user input consists in coordinates of a reference point (400) selected by the user on a touch screen of a video slot machine on which is displayed a matrix of symbols. The pattern selector (202) defines the reference point as the center of concentric circles (402) having different radii, and labels each cell according to the smallest circle (402) with which they intersect. Subsequently, the pattern selector (202) selects a speed for each virtual reel as a function of a corresponding label, and rotates the virtual reels accordingly, whereby the smaller the radius of a circle (402) with which a cell (118) intersects, the greater the speed at which a virtual reel associated to the intersected cell (118) is rotated. As a result, cells A and B are assigned the highest speed, cells C-D-E-F-G-H-I-K-L, the second highest speed, and cells P-Q-R-S-T-U-V-W, the third highest speed. The remaining cells, namely X and Y, are assigned the lowest speed.

The pattern selector (202) can select speeds by consulting a look-up table, wherein to each distance range is associated a corresponding speed. Alternatively, the pattern selector (202) may calculate each speed as a function of a corresponding distance.

In accordance with another aspect of the present invention, there is provided a reel type gaming device having interactive spin action visual effects, the reel-type gaming device including at least M reels, each reel having a number of symbols associated with it; a video display for displaying a video image of a M×N matrix of squares, each square associated with a symbol of a corresponding reel; and a spin actuator for interpreting user action to generate a variable direction vector as a function of the user action, the direction vector being fed to means to initiate a reel spin cycle and interactively produce different visual effects associated with the M×N matrix of squares as a function of the direction vector. The means to initiate a reel spin cycle is also referred to as a device to spin the M reels. Depicted in FIG. 3A and FIG. 3B, there is provided a reel-type slot machine which has a science-fiction theme and is therefore called Cash Meteor. Of course, the basic principle of the invention can be applied using any number of visuals.

The slot machine has a video display for displaying a video image 16 of a 5×5 matrix of squares (118), each square (118) associated with a symbol of a corresponding reel. It also includes a trackball spin actuator (200) for inputting a direction vector (300) and a speed to initiate a reel spin cycle and interactively produce visual effects associated with the 5×5 matrix of squares.

To the player, it appears that each square in the 5×5 matrix is its own little individual reel. This is in fact only a visual effect and does not imply that twenty-five separate reels are used to generate results; the program still uses five standard reels to generate the final result, but displays the spin action as a flickering of twenty-five separate squares. According to another embodiment, the actual flickering visual effect may be any visually enhancing effect, for example the simulation of a rotating reel or of flipping cards. According to yet another embodiment, the program uses 25 individual reels, each of which is assigned to a distinct square.

To initiate the spin, called Launch in this game, the player spins the trackball (122) in any direction. This generates a direction vector (300). Cash Meteor's rocketship (302) appears on the video display and travels over and across the video image (116) of the reels zone along this direction vector (if the player spins from bottom left to top right, the rocketship appears at the bottom left of the video display and travels to the top right, and so on). Behind the rocketship (302) is an invisible perpendicular line (or a pair of rays extending from the rocketship at an angle with less than 180 degrees between the rays, for example 120 degrees). Whenever this line passes over the center of a given square in the matrix in the course of the travel of the rocketship (302) along the direction vector, this square begins to spin with a speed related to the imparted speed of rotation of the trackball (122). The upshot of this process is that the squares will start spinning in a cascading effect, in the wake of the rocketship (302). For example, referring to FIG. 3A and FIG. 3B, the movement of the trackball (launching the rocketship) will make square 1 spin, followed by squares 2 and 3 almost simultaneously, then squares 4-5-6, then squares 7-8-9-10, 11-12-13-14-15, 16-17-18-19, 20-21-22, 23-24 and finally square 25. When all squares (18) are spinning, the stop action is put into effect, in the same order, and the spinning of all of the squares gradually comes to a stop. Of course, various visual effects may be produced predicated on the speed and direction of the trackball. For example, the speed of the spin of the squares along the direction vector of the rocketship (i.e. over which the rocketship travels) may be maximal while the speed of the spins of the squares to the wayside of the rocketship may drop off, the squares furthest from the rocketship spinning the slowest. Additionally or alternatively, the speed of the spins of the squares in the wake of the rocketship may also drop off as a function of the distance of the squares from the rocketship. Therefore, the 2D spin effect can be calculated with each play based on the user input or selected from a variety of pre-stored 2D spin effects as a function of the user input in a way that corresponds to the user input.

Once again, this alternative spin mechanism has no bearing on the results of the spin, which are still read according to standard paylines (5×5 paylines devised during the calibration of the slot machine), but the actual spin action will always be visually striking and different from one spin to the other.

The player can forego the trackball and press the Launch button in this game, i.e. the spin actuator (200) button (124) of the cabinet (112) or the spin actuator (200) touchscreen key (126). In this case, a vector is randomly chosen for the rocketship, unless the trackball has been used already, in which case the last vector determined by the trackball is used again.

The trackball may also be used as the primary input device for any bonus modes. For example, in one bonus mode, the trackball may be used to move a paddle horizontally. In another bonus mode, the trackball may be used to launch a ball in a specific direction, with a specific speed.

In a mechanical or video slot machine, the activation of a reel spin cycle typically initiates the rotation of reels in a simultaneous manner, according to a predetermined sequence, or according to a random sequence. However, players are not provided with the option of selecting a sequence of their choice according to which such rotation is to be initiated. An apparatus of the present invention enables players to perform such a selection, thereby providing for slot machines having enhanced flexibility.

Figure 5:
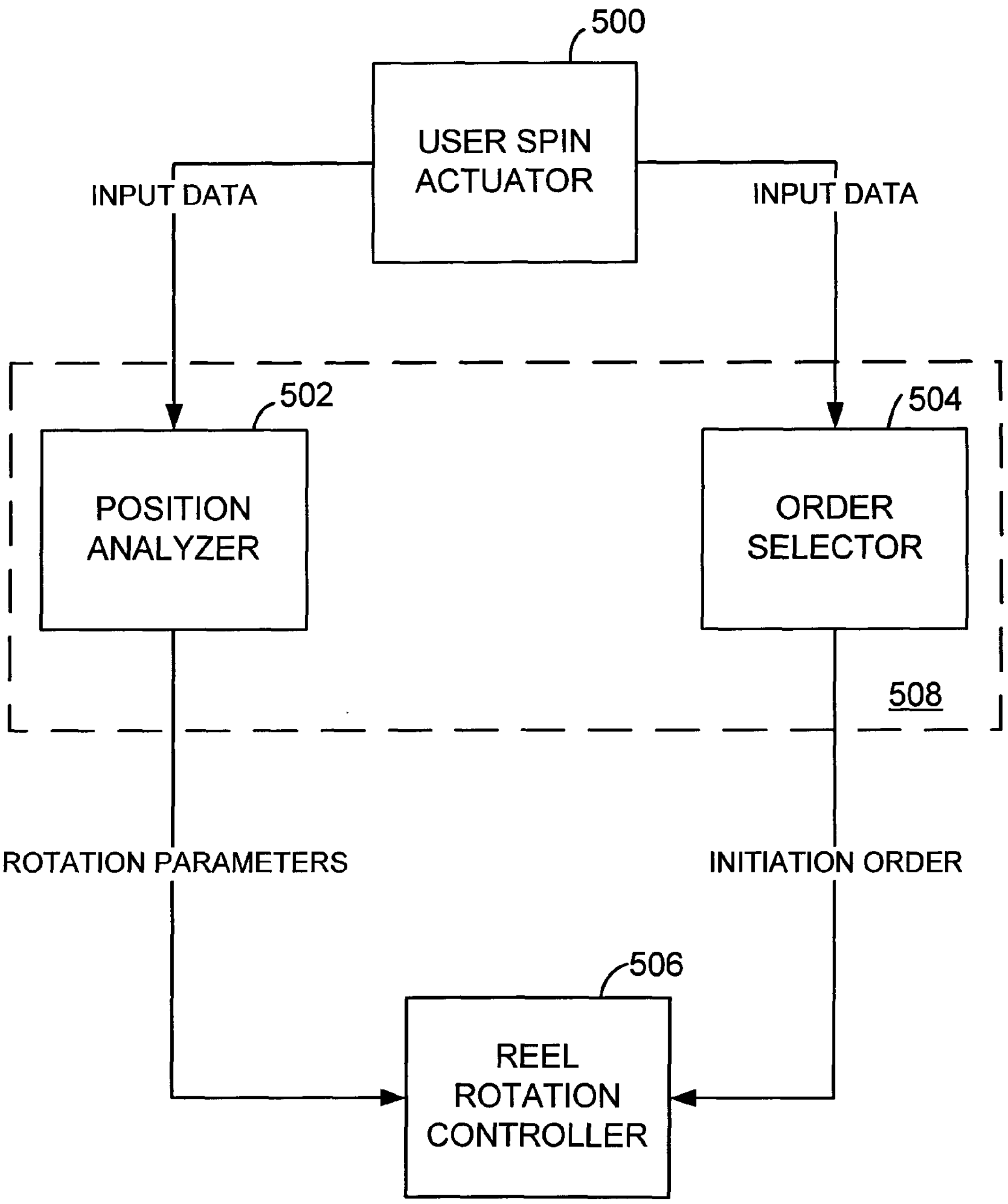
FIG. 5 is a block diagram of an apparatus of the present invention for controlling rotation of reels of a mechanical slot machine.

FIG. 5 illustrates a block diagram of an apparatus for controlling rotation of reels of a mechanical slot machine having rotating virtual or mechanical reels carrying symbols. The apparatus comprises a user spin actuator (500) for receiving user input, a feature manager (508) for selecting rotation features for each of the reels according to the user input, the features defining at least one of a rotation start, stop and speed; and a reel rotation controller (506) responsive to the features for controlling the rotation of reels The spin actuator (500) may be a track ball, a touchscreen, a standard slot machine button, or any combination thereof. According to a preferred embodiment, the spin actuator (500) is a touchscreen, and the user inputs a continuous series of reference points by swiping a finger across the screen of a mechanical slot machine presenting mechanical reels. Still according to the preferred embodiment, the feature manager (508) comprises an order selector for selecting one of a plurality of orders of reel rotation. More specifically, the order selector (504) calculates a vector direction as a function of coordinates of the aforementioned reference points, and consults a lookout table to select a predetermined order of reel rotation start according to the calculated direction. The lookout table associates each range of vector directions to a particular reel spin initiation order; for instance, a substantially downward swipe would cause top reels to be rotated prior to bottom reels, and a substantially leftward swipe would cause right reels to be rotated before left reels. Such a lookout table is advantageous as it is exclusively comprised of minimally entertaining reel rotation start orders. Consequently, players are always provided with entertaining reel rotations regardless of the input vector. Once the order is selected, the controller (506) initiates the rotation of the reels accordingly. According to another embodiment, the order selector (504) calculates the selected reel rotation initiation order. The order selector (504) can also, for instance, select one of a plurality of orders of reel rotation stop according to the user input, and the controller (506) stops the rotation according to the selected order of reel rotation stop.

Still referring to FIG. 5, and according to a preferred embodiment, the feature manager (508) comprises a position analyzer (502) for calculating a positional value for each of the reels as a function of a position of the reel with respect to a position of a reference point, wherein the user input comprises the reference point, and the controller (506) is responsive to the positional value for controlling the rotation. For instance, the position analyzer (502) may select a speed for each of the reels as a function of the positional value, wherein the positional value is a distance between the reference point and the reel, and the controller (506) rotates the reels at corresponding speeds. According to another example, the position analyzer (502) identifies those of the reels that are located above the reference point, and selects a rotation direction for the identified reels in order for the controller (506) to rotate them backwards.

Numerous modifications could be made to any of the embodiments described above without departing from the scope of the present invention.

The invention claimed is:

1. A video slot machine comprising:

a user spin actuator configured for receiving user input;

a display including a representation of a two-dimensional matrix of symbol display cells, each one of said cells containing a displayed symbol that is selected from a predetermined sequence of symbols associated with a separate one of said virtual reels;

a pattern selector configured for determining a two-dimensional spatial pattern of at least one of speed, start timing and stop timing with respect to said cells according to said user input; and a reel rotation controller configured to be responsive to said user input for independently rotating each one of said virtual reels for said cells, wherein said controller is configured to cause said display to present independent reel states in all of said cells with an animation of rotation, and to stop said rotation at a final outcome symbol for each of said cells, wherein said animation of rotation is controlled to follow said two-dimensional spatial pattern with respect to said cells.

2. The video slot machine of claim 1, wherein said two dimensional spatial pattern defines at least an order of reel rotation initiation.

3. The video slot machine of claim 1, wherein said two dimensional spatial pattern defines at least an order of reel rotation stop.

4. The video slot machine of claim 1, wherein said two dimensional spatial pattern defines at least an animation direction for each of said reels.

5. The video slot machine of claim 1, wherein said two-dimensional spatial pattern defines speed of rotation for each of said reels.

6. The video slot machine of claim 1, wherein said user input comprises a vector, and said pattern selector selects said spatial pattern according to said vector.

7. The video slot machine of claim 6, wherein said pattern selector selects said spatial pattern according to a direction of said vector.

8. The video slot machine of claim 1, wherein said user input comprises a reference point, and said pattern selector is configured to select said spatial pattern according to a position of each of said cells with respect to a position of said reference point.

9. The video slot machine of claim 8, wherein said pattern selector is configured to select said spatial pattern according to distances between said reference point and each of said-cells.

10. The video slot machine of claim 1, wherein said spatial pattern is a wave propagating across said matrix, and those of said cells defining a wave front present a same animation of rotation.

11. The video slot machine of claim 1, wherein said animation comprises presenting said symbols as sliding in and out of said cells according to said sequence.

12. The video slot machine of claim 1, wherein said spin actuator is a trackball.

13. The video slot machine of claim 1, wherein said matrix is larger than a three by three matrix.

14. The video slot machine of claim 13, further comprising horizontal and vertical paylines.

15. A reel type gaming device having interactive spin action visual effects, the reel-type gaming device including at least M reels, each reel having a number of symbols associated with it; a video display configured for displaying a video image of a M×N matrix of squares, each square associated with a symbol of a corresponding reel; and a spin actuator configured for interpreting user action to generate a variable direction vector as a function of said user action, the direction vector being fed to a device to initiate a reel spin cycle and interactively produce a variable 2D visual effect associated with each one of said squares of said M×N matrix as a function of the direction vector.

16. The gaming device of claim 15 including M×N number of reels, wherein each of said squares exclusively presents said symbols of a corresponding one of said reels.

17. The gaming device of claim 15, wherein said matrix is larger than a three by three matrix.

18. The gaming device of claim 17, further comprising horizontal and vertical paylines.

19. The gaming device of claim 15, wherein said visual effect comprises presenting said symbols as sliding in and out of said cells according to said sequence.

20. The gaming device of claim 15, wherein said spin actuator is a trackball.

21. An apparatus for controlling rotation of reels of a mechanical slot machine having mechanical reels carrying symbols, the apparatus comprising:

a user spin actuator configured for receiving user input;

a feature manager configured for selecting rotation features for each of said reels according to said user input, said features defining at least one of a rotation start, stop and speed; and a reel rotation controller configured to be responsive to said features and configured for controlling said rotation of all of said reels from a common said user input, wherein said feature manager comprises at least one of:

an order selector configured for selecting one of a plurality of reel rotation orders according to said user input; and a position analyzer configured for calculating a positional value for each of said reels as a function of a position of said reel with respect to a position of a same reference point, and configured for selecting said rotation features for each one of said reels according to a corresponding one of said positional value, said user input defining said same reference point.

22. The apparatus of claim 21, wherein said user input comprises a variable direction vector, said feature manager comprises said order selector, and said order selector is configured to select said order according to a direction of said vector.

23. The apparatus of claim 21, wherein said feature manager comprises said order selector, said order selector is configured to select one of a plurality of orders of reel rotation start according to said user input, and said controller is configured to start said rotation according to said selected order of reel rotation start.

24. The apparatus of claim 21, wherein said feature manager comprises said position analyzer, said position analyzer is configured to select a speed for each of said reels as a function of said positional value, said positional value is a distance between said reference point and said reel, and said controller is configured to rotate said reels at said speed.

25. The apparatus of claim 21, wherein said spin actuator is a trackball.

* * * * *